United States Patent
Donley et al.

(10) Patent No.: US 12,210,767 B2
(45) Date of Patent: Jan. 28, 2025

(54) COMBINING WRITE TRANSACTIONS OF A LARGE WRITE

(71) Applicant: ADVANCED MICRO DEVICES, INC., Santa Clara, CA (US)

(72) Inventors: Gregg Donley, Santa Clara, CA (US); Girish Balaiah Aswathaiya, Austin, TX (US); Vydhyanathan Kalyanasundharam, Santa Clara, CA (US); Bryan Broussard, Austin, TX (US)

(73) Assignee: ADVANCED MIRCO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/032,217

(22) Filed: Sep. 25, 2020

(65) Prior Publication Data

US 2022/0100411 A1 Mar. 31, 2022

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ...... G06F 3/0655; G06F 3/0679; G06F 12/00; G06F 13/00; G06F 3/06; G06F 3/0656; G06F 3/0604
See application file for complete search history.

(56) References Cited

U.S. PATENT DOCUMENTS

| | | | |
|---|---|---|---|
| 6,324,612 B1 | 11/2001 | Chen et al. | |
| 9,665,303 B1 * | 5/2017 | Huff | G06F 3/0604 |
| 11,609,695 B2 * | 3/2023 | Krasner | G06F 3/0608 |
| 2003/0126336 A1 | 7/2003 | Creta et al. | |
| 2005/0235067 A1 | 10/2005 | Creta et al. | |
| 2011/0078393 A1 * | 3/2011 | Lin | G06F 3/0679 |
| | | | 711/155 |
| 2011/0252187 A1 * | 10/2011 | Segal | G06F 12/0246 |
| | | | 711/103 |

(Continued)

OTHER PUBLICATIONS

International Search Report and Written Opinion, PCT/US2021/051181, Jan. 3, 2022, 11 pages.

*Primary Examiner* — Tuan V Thai

(57) ABSTRACT

A system for combining write transactions of a large write includes a processor including at least a first die and a second die, and a link coupling the first die and the second die. When a link interface on one die transmits packets to the other die over the link, the link interface identifies, from a queue containing a plurality of write transactions, two or more write transactions in the queue that are candidates for combination based on one or more attributes of each write transaction. The link interface determines whether two or more candidate write transactions are combinable based on a set of conditions. When two or more candidate write transaction are combinable, the link interface combines the candidate write transactions into a single combined write transaction and transmits the combined write transaction. A link interface on the receiving die decodes the combined write transaction and iteratively regenerates the individual write transactions using control information in the combined write transaction.

20 Claims, 11 Drawing Sheets

(56) References Cited

U.S. PATENT DOCUMENTS

| | | | |
|---|---|---|---|
| 2012/0221767 A1* | 8/2012 | Post | G06F 3/061 |
| | | | 711/103 |
| 2013/0091307 A1* | 4/2013 | Lai | G06F 3/0659 |
| | | | 710/4 |
| 2020/0257468 A1* | 8/2020 | Atmakuri | G06F 3/0659 |

\* cited by examiner

Packet Transmitter 202

Identify, from a queue containing a plurality of write transactions, two or more write transactions in the queue that are candidates for combination based on one or more attributes of each write transaction 402

Determine whether a fabric identifier of an incoming write transaction matches a fabric identifier of an existing write transaction in the queue 502

Determine whether an offset entry of the incoming write transaction and an offset entry of the existing write transaction are consecutive 504

Determine, in dependence upon a set of conditions, whether two or more candidate write transactions are combinable 404

Combine, in response to determining that at least two candidate write transactions are combinable, the at least two candidate write transactions into a combined write transaction 406

Transmit, to a packet receiver, the command for the combined write transaction over a fabric link 408

Command 403

FIG. 5

Packet Transmitter 202

Identify, from a queue containing a plurality of write transactions, two or more write transactions in the queue that are candidates for combination based on one or more attributes of each write transaction 402

Determine, in dependence upon a set of conditions, whether two or more candidate write transactions are combinable 404

Determine whether the two or more candidate write transactions can use the same data compression scheme 602

Combine, in response to determining that at least two candidate write transactions are combinable, the at least two candidate write transactions into a combined write transaction 406

Transmit, to a packet receiver, the command for the combined write transaction over a fabric link 408

Command 403

FIG. 6

COMBINING WRITE TRANSACTIONS OF A LARGE WRITE

BACKGROUND

Processors may contain multiple dies in a single integrated circuit, chip, or package. When connecting separate dies, and when connecting separate processing nodes together, each with a respective fabric, the data is transferred over a significantly lower number of physical wires, which limits available bandwidth. Link bandwidth between processor dies is a premium resource due to lower available bandwidth and overhead to transmit control information and data over the same set of wires. Therefore, reducing the amount of bandwidth required to transmit control information is advantageous.

BRIEF DESCRIPTION OF THE DRAWINGS

FIG. 5 sets forth a flow chart illustrating another example method of combining write transactions of a large write in accordance with embodiments of the present disclosure.

FIG. 6 sets forth a flow chart illustrating another example method of combining write transactions of a large write in accordance with embodiments of the present disclosure.

DETAILED DESCRIPTION

Figure 1:
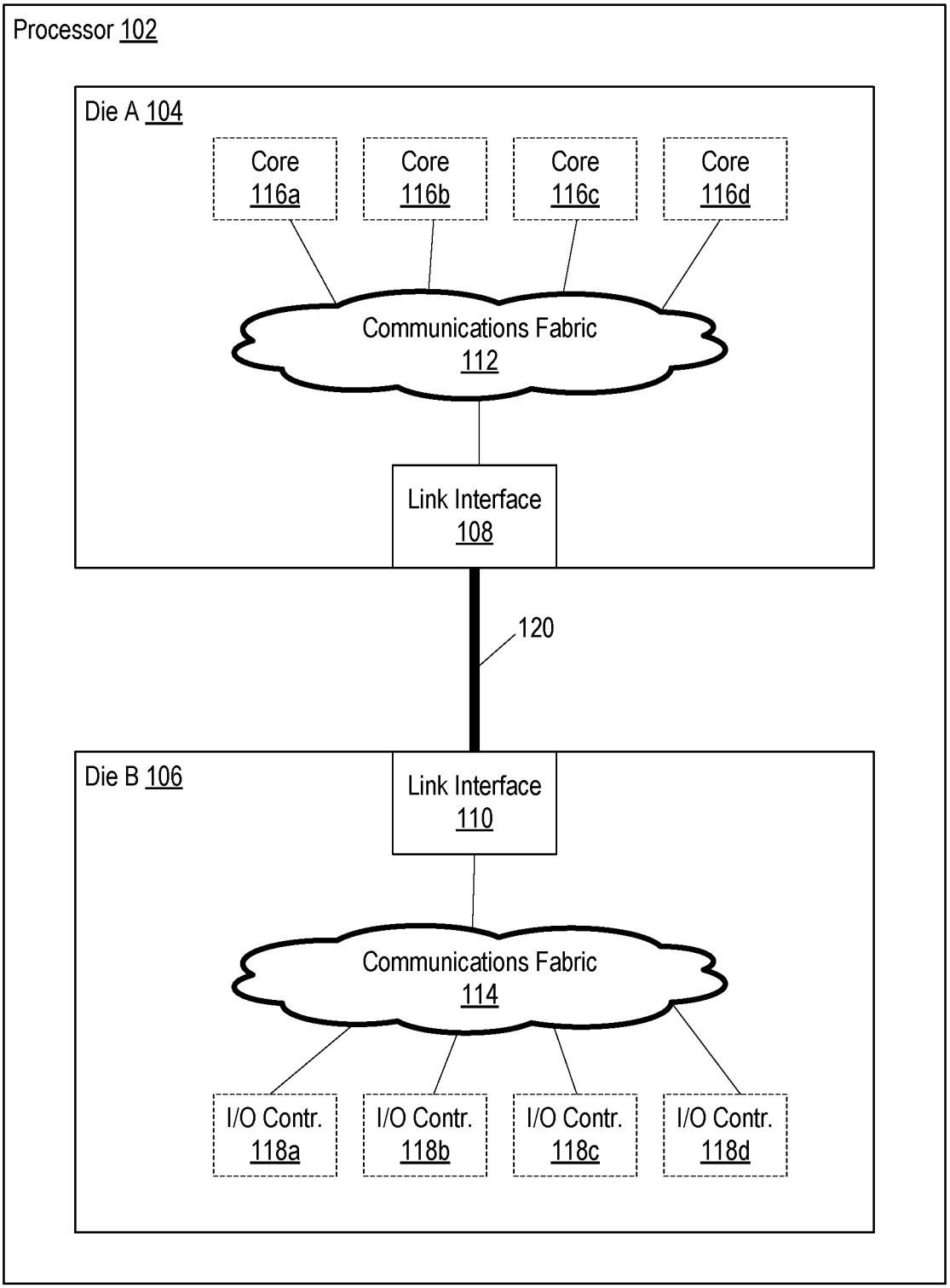
FIG. 1 sets forth a block diagram of an example processor in which combining write transactions of a large write is carried out according to embodiments of the present disclosure.

To conserve link bandwidth in communication channels among disparate nodes (e.g., chips or dies), command flits are packed with as much control information and data as possible without increasing latency in the processing of transaction requests. However, when the latency is high, e.g., due to oversubscription of the link with transaction requests, the latency interval presents an opportunity to further identify data locality and flow control characteristics that will allow additional information to be packed into the command flit. Embodiments in accordance with the present disclosure are directed to combining fragments of large write transactions that target sequential memory addresses into a combined write transaction for placement as a command in the command flit, such that, through combination, the number of command flits is reduced and link bandwidth is conserved.

In the following examples, when a component of one node issues a transaction (e.g., a write request) directed to a component of another node, the transaction is transmitted as a command in a command flit over link between the two nodes. A link interface on each node is configured for sending and receiving the command flits and data flits over the link, including packing transactions received over the on-chip fabric as commands in the command flit, and unpacking commands in the command flit into transactions transmitted over the on-chip fabric. Each transaction issued by a node component over an on-chip fabric transmit identifier that is unique to the source node component issuing the transaction request over the fabric and a tag that identifies the transaction. In one example, when a write transaction that is larger than the size for which the on-chip fabric is optimized is issued for transmission over the link, the write transaction may be fragmented into smaller write transactions, in which the same tag is used for each write transaction that is a fragment of the original larger write transaction. In accordance with the present disclosure, when a transaction source reuses the same transaction tag, these transactions become candidates for combining in that these requests often target the same block of memory addresses, such as successive cache lines. Two or more transactions that target sequential memory addresses and satisfy other conditions are combined by setting control flags in the write transaction with the lowest target memory address including a control flag indicating that the combined write transaction represents N number of write transactions. The remaining write transactions that are the subject of the combining may be removed from the ingress queue. When the combined write transaction is included as a command of a command flit, the control flags indicate to a command flit receiver that the combined write transaction in the command should be regenerated N−1 times with incremented target memory addresses or offsets relative to the target memory address or offset in the received combined write transaction. Thus, in effect, multiple write transactions may be compacted into one combined write transaction by a sender using an indication of a particular number of write transactions that should be derived from the combined write transaction, and by the receiver regenerating the combined write transaction according the indication with an incremented target memory address or offset. Hence, a technical advantage is that, to preserve link bandwidth and prevent oversubscription of the link (e.g., when the bandwidth of the link is less than the bandwidth of the on-chip fabric), previously fragmented write transactions may be recombined and represented as one combined write transaction, thereby effectively increasing the number of write transactions that may be represented in a command flit transmitted over an communication channel between chips, and thus conserving link bandwidth.

An embodiment in accordance with the present disclosure is directed to a method of combining write transactions of a large write that includes identifying at least two write transactions in a queue that are candidates for combination based on one or more attributes of each write transaction. The method also includes combining the at least two candidate write transactions. The method further includes transmitting the combined write transactions.

In some embodiments, identifying at least two transactions in the queue that are candidates for combination includes determining whether a fabric identifier of an incoming write transaction matches a fabric identifier of an existing write transaction in the queue, and determining whether an offset entry of the incoming write transaction and an offset entry of the existing write transaction are consecutive.

In some embodiments, the fabric identifier includes a transmit identifier and a tag, where the tag may identify a block of target memory locations, and an offset entry of the incoming write transaction and an offset entry of the existing write transaction each identify a target memory location in the block.

In some embodiments, determining whether two candidate write transactions are combinable may include determining whether the two or more candidate write transactions use the same data compression scheme.

In some embodiments, combining two candidate write transactions may include creating a data structure including pointers to a plurality of data buffers associated with each candidate write transaction.

In some embodiments, a first control flag indicates that a command includes a combined write transaction and a second control flag indicates the number of write transactions that have been combined.

In some implementations, a packet transmitter that transmits a combined write transaction may be a component of a first die of a processor and a packet receiver that receives the combined write transaction may be a component of a second die of the processor. A link may communicatively couple the packet transmitter and the packet receiver. The first die may include one or more components communicatively coupled to the packet transmitter via a communications fabric. The processor may be at least one of a system-on-a-chip (SoC), system-on-a-package (SiP), or a multi-chip module (MCM).

Another embodiment in accordance with the present disclosure is directed to a method of combining write transactions of a large write that includes receiving a command for a write transaction over a fabric link. The method also includes determining, in response to identifying that the command indicates a combined write transaction, a number of write transactions represented by the combined write transaction. The method further includes iteratively servicing the combined write transaction for each write transaction represented by the combined write transaction.

In some embodiments, the method also includes allocating at least one data buffer for each individual write transaction.

In some embodiments, iteratively servicing the combined write transaction for each write transaction represented by the combined write transaction includes selecting the command for output from the output queue, incrementing an offset in a queue entry for the command, updating a pointer to a data buffer the queue entry for the command, and reselecting the command for output from the output queue.

In some embodiments, the method also includes decompressing a target memory address in each command packet.

In some embodiments, the command includes at least a first control flag indicating that the command packet includes a combined write transaction and a second control flag indicating the number of write transactions that have been combined.

In some implementations, a packet transmitter that transmits the combine write transaction may be a component of a first die of a processor and a packet receiver that receives the combined write transaction may be a component of a second die of the processor. A link may communicatively couple the packet transmitter and the packet receiver. The first die may include one or more components communicatively coupled to the packet transmitter via a communications fabric. The processor may be at least one of a system-on-a-chip (SoC), system-on-a-package (SiP), or a multi-chip module (MCM).

Yet another embodiment is directed to an apparatus for combining write transactions of a large write including a processor including at least a first die and a second die, a link coupling the first die and the second die, and a link interface on the first die configured to transmit packets over the link. In this embodiment, the link interface is further configured to carry out the step of identifying at least two write transactions in a queue that are candidates for combination. The link interface is also configured to carry out the step of combining the at least two candidate write transactions. The link interface is also configured to carry out the step of transmitting the combined write transactions.

Yet another embodiment in accordance with the present disclosure is directed to an apparatus for combining write transactions of a large write including a processor including at least a first die and a second die, a link coupling the first die and the second die, and a link interface on the first die configured to receive packets over the link. The link interface is further configured to carry out the step of receiving a command for a write transaction. The link interface is also configured to carry out the step of determining in response to identifying that the command indicates a combined write transaction, a number of write transactions represented by the combined write transaction. The link interface is also configured to carry out the step of iteratively servicing the combined write transaction for each write transaction represented by the combined write transaction.

Yet another embodiment in accordance with the present disclosure is directed to a system for combining write transactions of a large write including a processor including at least a first die and a second die, a link coupling the first die and the second die, and a link interface on the first die configured to transmit packets over the link. The first link interface is further configured to carry out the step of identifying at least two write transactions in a queue that are candidates for combination. The link interface is also configured to carry out the step of combining the at least two candidate write transactions. The link interface is also configured to carry out the step of transmitting the combined write transactions. In some implementations, the link interface is further configured to carry out the steps of receiving a command packet for a write transaction. The link interface may also be configured to carry out the step of determining in response to identifying that the command packet indicates a combined write transaction, a number of write transactions represented by the combined write transaction. The link interface may also be configured to carry out the step of iteratively servicing the combined write transaction for each write transaction represented by the combined write transaction.

For further explanation, FIG. 1 sets forth a block diagram of an example processor in which combining write transactions of a large write is carried out according to embodiments of the present disclosure. The example of FIG. 1 includes a processor (102). In some embodiments, the components of the processor (102) are individual dies on an integrated circuit (IC), such as a system-on-a-chip (SoC). In other embodiments, the components are individual dies in a system-in-package (SiP) or a multi-chip module (MCM). In the example of FIG. 1, the processor (102) includes die A (104) and die B (106). While the processor (102) is shown with only two dies, it will be appreciated that the processor (102) may include any number of dies. In the processor (102) of FIG. 1, die A (104) and die B (106) each include a respective link interface (108, 110) coupled to a respective communications fabric (112, 114) for communication with other components on the die. For illustration and not limitation, die A may be a CPU die including a number of component cores (116a, 116b, 116c, 116d) coupled to the communication fabric (112), and die B may be an input/output (I/O) die including a number of component I/O controllers (118a, 118b, 118c, 118d) coupled to the communications fabric (114). A link (120) couples the link interface (108) of die A (104) to the link interface (110) of die B (106). The link (120) transports command flits between die A (104) and die B (106) for communication between components of die A (104) and die B (106) via the respective link interfaces (112, 114).

Figure 2:
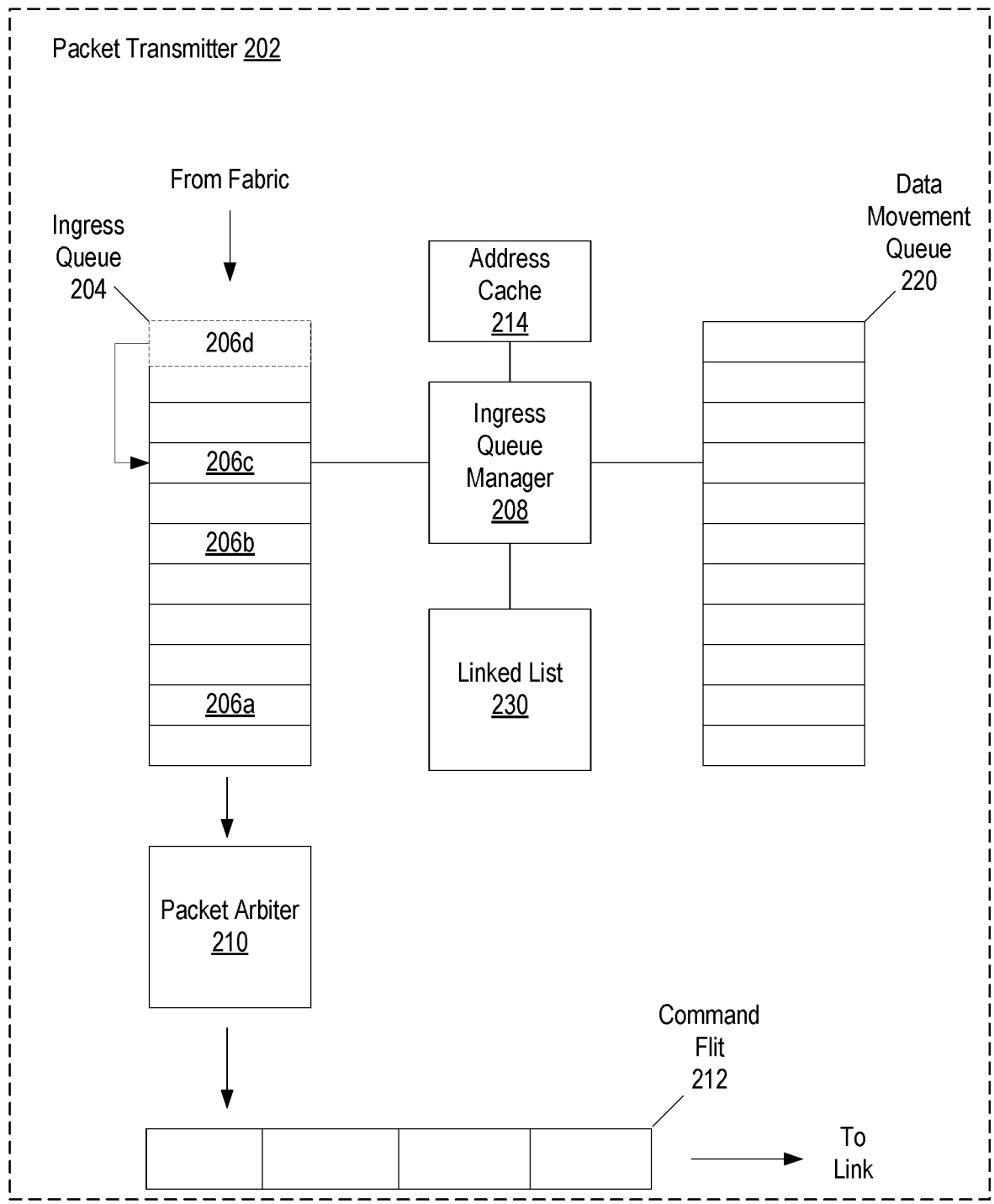
FIG. 2 sets for a functional block diagram of an example system for combining write transactions of a large write in accordance with embodiments of the present disclosure.

For further explanation, FIG. 2 sets forth a block diagram of an example packet transmitter in which combining write transactions of a large write is carried out according to embodiments of the present disclosure. The example of FIG. 2 includes a packet transmitter (202). The packet transmitter may be implemented in a link interface (e.g., the link interface (108) or the link interface (110) of FIG. 1). The packet transmitter (202) includes a queue (204) for storing transactions received over a communications fabric (e.g., the communications fabric (112) or the communications fabric (114) of FIG. 1). The transactions may be, for example, read request transactions, write request transactions, probe transactions, response transactions, and token transactions, each with a corresponding queue for transaction processing. For the purpose of this disclosure, the queue (204) includes a number of write request transactions (206a, 206b, 206c, 206d) among other write transactions not identified. The packet transmitter (202) also includes a queue manager (208). The queue manager (208) includes control logic that, among other aspects, identifies write transactions that are combinable. The packet transmitter (202) also includes a packing arbiter (210) that obtains transactions from the queue (204) and other transaction queues not identified, and packs those transactions as commands in a command flit (212). The command flit (212) may include two or more commands each including a transaction. In the following description, the terms command and transaction may be used interchangeably, as each command in a command flit includes a transaction; however, as described below, a transaction may be a combined transaction representing multiple transactions. The packet transmitter (202) also includes an address cache (214) that stores cache entries for blocks of addresses (e.g., target memory addresses of recently used addresses). The address cache (214) may be synchronized with an address cache of one or more other address caches on different processor components (e.g., the address cache (314) of packet receiver (302) in FIG. 3).

Each write transaction (206a, 206b, 206c, 206d) in the queue (204) is part of a corresponding write request (not shown). The write request may be divided into a write command packet (i.e., control packet) and data packets. The write command packet may be stored in the queue (204) as a write transaction, whereas write request data may be managed by a separate queue (not shown in FIG. 2). The write transaction includes a transmit identifier entry and a tag entry. The transmit identifier is unique to the node component (e.g., a processor) that issued the write request, and the tag identifies the write request from the node component. Together, the transmit identifier and the tag make up a unique fabric identifier. However, when a write request source issues write transactions that are part of the same data stream (e.g., indicated by a chain bit that is asserted in the command packet), the write request source reuses the tag for successive write transactions. For example, the successive write transactions may share a locality characteristic, such as a target memory address range, block, page, etc. A series of write transactions from the same source component that reuse the same tag may be fragments of a "large write." For example, each fragment write transaction of the original large write may target successive cache lines in a block of addresses, the transaction source may set an a chain bit in the command packet for all packets in the chain (except the final packet) and reuse the same tag for each command packet.

The write transaction also includes a target memory address field. The target memory address indicates a memory location to which data associated with the command packet is to be written. For example, the target memory address may be a cache line specified by an offset in a block of addresses. The write transaction also includes source data information. The source data information describes the data to be written to the target memory address. For example, the source data information may include location information such as one or more pointers to a data buffer (e.g., a head pointer and a tail pointer). The write transactions also includes flow control information, as will be described in detail below.

Consider an example where a source component (e.g., a processor) on the node (e.g., a die) issues a 256 byte write transaction to a block of cache lines in a memory component of another node. In this example, the communications fabric on the node has a bandwidth of 64 bytes, such that the 256 byte write transaction must be broken up into 4 write transaction fragments of the original write transaction. Each write transaction fragment targets successive lines of a 256 byte block of the cache, and each write transaction fragment includes the same fabric identifier indicating that each write transaction fragment originated as part of a larger write. In this example, the write transaction fragments may be considered to be combinable write transactions. For example, a write transaction that targets an offset of 1 may be combined with a write transaction that targets and offset of 0 if the two write transactions share the same fabric identifier. Likewise, a write transaction that targets an offset of 2 may be combined with a write transaction of that targets an offset of 1, or with a combined write transaction that targets offsets 0-1, if the two write transactions share the same fabric identifier.

To conserve bandwidth, the queue manager (208) identifies write transactions in the queue (204) that may be candidates for combination based on attributes of the write transaction. When latency in the queue is high, the queue manager (208) has the opportunity, without further increasing latency, to analyze write transactions in the queue to determine whether they are candidates for combination. In some embodiments, the queue manager identifies candidates for combination based on the fabric identifier of the write transaction. Write transactions that share the same fabric identifier are candidates for combination. For example, when a write transaction arrives at the queue (204), the queue manager (208) may perform a content addressable memory (CAM) search of the queue (204) in order to determine whether any existing write transactions in the queue (204) have the same fabric identifier. In the example of FIG. 2, write transactions (206b, 206c, 206d) share the same fabric identifier. That is, the write transactions (206b, 206c, 206d) were issued from the same source, which used the same tag for each write transaction. In other words, the write transactions (206b, 206c, 206d) are all write transaction fragments of a larger write transaction, and thus may be considered combinable.

In some embodiments, the queue manager identifies candidates for combination based on the target memory addresses (e.g., an offset in a block of memory addresses) of the write transaction. To combine two or more write transactions, the target memory addresses in the two or more write transactions must be sequential. For example, when multiple write requests target successive cache lines, the target memory addresses in those multiple write requests may be sequential. When a write transaction arrives at the queue (204), the queue manager (208) may perform a content addressable memory (CAM) search of the queue (204) in order to determine whether the arriving write transaction targets a memory address that is sequential with an existing write transaction in the queue (202). In the example of FIG. 2, some write transactions (206b, 206c, 206d) share the same fabric identifier also target sequential memory addresses, whereas another write transaction (206a) that shares the same fabric identifier does not target a memory address in sequence. Accordingly, as they arrive, the queue manager may determine that the latter received write transactions (206b, 206c, 206d) are candidates for combination with an existing write transaction (206a) in the queue.

In some embodiments, write transactions with compressible addresses are candidates for combination. In one example, the queue manager (208) performs the CAM search of the queue (204) while comparing the target memory addresses of the incoming write transaction to addresses in the address cache (214) to determine whether the target memory address may be compressed. For example, as write transactions (206a, 206b, 206c, 206d) arrive, the queue manager (208) determines whether the corresponding target memory address is already present in the address cache. If, the address is not present, the address is added to the address cache (214); if the address is present, the target memory address may be compressed. In a compressed address, a portion of the target memory address is replaced with a pointer to a cache entry. For example, the address cache (214) may include entries for blocks of addresses. When multiple write transactions target the memory addresses in the same block of addresses, a portion of each target memory address may be replaced with a reference to the entry in the address for that block of addresses. Because write transactions with compresses addresses target a memory location as previously received write transactions, those write transactions may be candidates for combining.

The queue manager (208) determines whether the write transactions that are candidates for combination are combinable write transactions based on one or more conditions. In some embodiments, a condition that determines the combinability of candidate write transactions is that the data associated with the write transactions that are candidates for combination can be compressed using the same data compression scheme. For example, after data corresponding to the write transactions arrives at the packet transmitter, the queue manager (208) may determine that an arriving write transaction shares the same fabric identifier and also targets a consecutive offsets with respect to an existing write transaction or combined write transaction in the queue (208) that is a candidate write transaction.

Continuing the above example, consider that, as a write transaction (206c) arrives, the queue manager determines that the write transaction (206c) shares the same fabric identifier as an existing write transaction (206b) in the queue, and also determines that the latter received write transaction (206c) targets a memory location with an offset of 2 whereas the existing write transaction (206b) targets a memory location with an offset of 2. Because a condition for combinability is that the write transactions (206b, 206c) must target sequential memory locations (e.g., sequential cache lines), the write transactions (206b, 206c) are not combinable. Now consider that as another write transaction (206d) arrives, the queue manager (208) determines that the write transaction (206d) shares the same fabric identifier as the existing write transaction (206c) in the queue, and targets a memory location with an offset of 3. Because the write transactions (206c, 206d) share the same fabric identifier and target sequential offsets, the write transactions (206c, 206d) are combinable.

In some embodiments, a condition that determines the combinability of candidate write transactions may be that the data associated with the write transactions that are candidates for combination can be compressed using the same data compression scheme. For example, after data corresponding to the write transactions arrives at the packet transmitter, the queue manager (208) may determine that data associated a write transaction can be compressed using the same compression scheme as used by data associated with an existing write transaction or combined write transaction in the queue (208) that is a candidate write transaction.

The queue manager (208) also combines write transactions that have been determined to be combinable. The queue manager (208) combines write transactions by indicating in the command packet of a single write transaction that the single write transaction is a combination of two or more write transactions. For example, the queue manager (208) may select the oldest write transaction in the queue with a target memory address that is first in the sequence of target memory addresses and indicate in the command packet that the write transaction is a combined write transaction as well has how many write transaction have been combined. Queue entries for the remaining write transactions in the queue (204) that are the subject of the combined write transaction are marked as invalid. In some embodiments, command packet includes flow control fields or flags that indicates that the command packet includes a combined write transaction and how many write transactions are includes. Continuing the example of FIG. 2, having determined that two write transactions (206c, 206d) are combinable, and that a write transaction (206c) targets the first memory address in the sequence, control bits in the command packet of the first write transaction (206c) are set to indicate that the write transaction is a combined write transaction and that two write transactions have been combined, while the queue entry for the remaining write transaction (206d) is marked as invalid. In a particular implementation, a 1-bit control flag is used to designate that the single write transaction is a combined write transaction, and a 2-bit control flag is used to designate the number of write transactions (e.g., the number of cache lines to be written) in the combined write transaction, such that no more than four write transactions are combined in a single write transaction.

The packing arbiter (210) inserts a command for the combined write transaction into the command flit (212) for transmission to a packet receiver over the fabric link. Prior to transmitting the command flit, the packing arbiter (210) determines whether the packet transmitter (202) has received a sufficient number of tokens from the packet receiver to accommodate all transactions in the command flit, including each of the transactions that have been combined. The token represents a traffic or resource credit and indicates that the packet transmitter has been allocated virtual channels, lanes and/or buffers for receiving the command flit. For example, if a command packet has combined two write transactions, each of those write transaction must have a data buffer allocated to it. Although only one command buffer may be required to accommodate a combined write transaction, if the packet receiver cannot accommodate all of the data corresponding to each write transaction in the combined write transaction in the requisite number of data buffers, the combined write transaction should be uncombined.

The packet transmitter (202) also includes a first-in-first-out (FIFO) data movement queue (220) for storing pointers to data buffers associated with each write transaction in the ingress queue (204). When a command packet corresponding to a write transaction is dispatched from the ingress queue (204) to a packet receiver, the data referenced by the associated pointer in the data buffer (220) is also transmitted at a later time. Each entry in the data movement queue (220) includes the fabric identifier of the corresponding write transaction in the ingress queue (204). However, when multiple write transactions in the ingress queue (204) are combined, because the entry for the write transaction that is the subject of combining is deleted, the pointer to the data buffer of the deleted entry must be associated with the combined entry. Therefore, the packet transmitter (202) also includes a data structure (230) such as a linked list. When a first write transaction is combined with a second write transaction, the pointers to their respective data buffers are copied to the data structure (230), and an entry in the data movement queue is created to point to the head of the data structure (230). When subsequent write transactions are combined with the first and second write transactions, pointer to their respective data buffers are added to the tail of the data structure. Thus, when the data movement queue entry for the combined write transaction is processed, the data structure is advanced to access the respective data buffer of each write transaction in the combined write transaction. In some embodiments, the data structure is implemented as a linked list in hardware registers.

Figure 3:
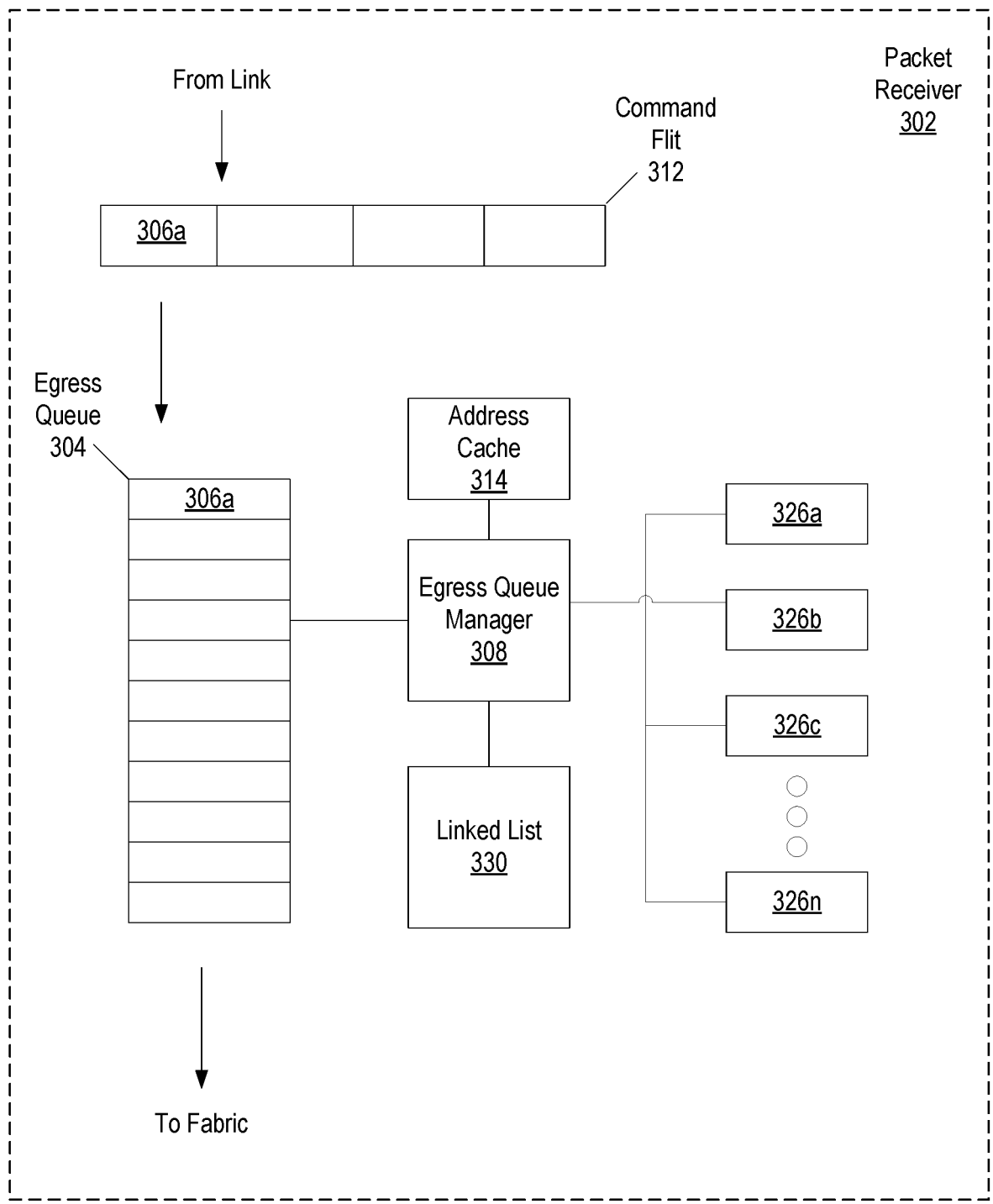
FIG. 3 sets for a functional block diagram of another example system for combining write transactions of a large write in accordance with embodiments of the present disclosure.

For further explanation, FIG. 3 sets forth a functional block diagram of an example packet receiver in which large write decoding is carried out according to embodiments of the present disclosure. The example of FIG. 2 includes a packet receiver (302). The packet receiver (302) may be implemented in a link interface (e.g., the link interface (108) or the link interface (110) of FIG. 1). The packet receiver (302) includes an egress queue (304) for storing request transactions received in a command flit (312) over a fabric link for dispatch to a communications fabric (e.g., the communications fabric (112) or the communications fabric (114) of FIG. 1). The transactions may be, for example, request transactions (i.e., read/write), probe transactions, response transactions, and token transactions. In some examples, there may be an egress queue for each type of transaction. The packet receiver (302) also includes an egress queue manager (308). The egress queue manager (308) includes control logic that, among other aspects, identifies commands in the command flit and unpacks them into individual transactions. In the example of FIG. 3, a combined write transaction (306a) is unpacked from the command flit and inserted into request egress queue (304). The packet receiver (302) also includes an address cache (314) that stores cache entries for blocks of addresses. The address cache (314) may be synchronized with an address cache of one or more other address caches on different processor components (e.g., the address cache (214) of packet receiver (202) in FIG. 2). The packet receiver (302) also includes a number of data buffers (326a-n). For example, the data buffers (326a-n) may be used to receive data associated with write requests. As data associated with the combined write transaction is received, a data structure such as a linked list may be constructed to associate pointers to the data buffers containing the combine write transaction data with the combined write transaction entry in the queue (304).

The egress queue manager (308) receives one or more commands that have been unpacked from the command flit (312) and determines, from the command, whether the command is for a combined write transaction. When the command is for a combined write transaction, the egress queue manager (308) determines how many combined write transactions are represented in the combined write transaction. Whether the command is for a combined write transaction and the number write transactions is determined from information in the command, such as a packet header. In some embodiments, the egress queue manager (308) identified that a control flag in the command indicates the command is for a combined write transaction, and another control flag indicates how many write transactions have been combined in the combined write transaction. In some embodiments, the egress queue manager (308) decompresses the target memory address by accessing the address cache to determine a cache entry including a portion of the decompressed target memory address. The portion may indicate block of addresses that includes the target memory address. As data associated with the combined write transaction is a received, the data is loaded into a number of data buffers (326) corresponding to the number of write transactions represented by the combined write transaction. A data structure (e.g., linked list (330)) is updated with pointers to those data buffers including an entry for each pointer to a data buffer (326) associated with the combined write transaction, and a pointer to the linked list (330) is added to the queue entry for the combined write transaction, such that as the combined write transaction is serviced for dispatch onto the communications fabric, the linked list (330) is advanced to the next entry to identify the pointer to the next data buffer (326) that corresponded to the next individual write transactions represented in the combined write transaction.

The egress queue manager (308) also includes control logic for a state machine that repeatedly services the combined write transaction for each individual write transaction represented in the combined write transaction. For example, when a combined write transaction (306a) is ready for dispatch onto the communications fabric, the egress queue manager (308) loads the first data buffer in the linked list (330) associated with the combined write transaction (306a) and dispatches the write transaction to the target memory address identified in the combined write transaction. The egress queue manager (308) increments the target memory address of the combined write transaction, advances the linked list to identify the next data buffer associated with combined write transaction, and dispatches another write transaction to the incremented target memory address with the pointer to the next data buffer (326). The egress queue manager continues this process until the number of times the combined write transaction (306a) is serviced is equal to the number of write transactions indicated in the combined write transaction. In other words, for example, when a combined write transaction indicates a plurality of write transactions, the combined write transaction (306a) is repeatedly serviced with the target memory address incremented after each dispatch and the data provided using the current value of the data buffer pointer, before advancing the pointer to the next data buffer (326) in the list (330).

Figure 4:
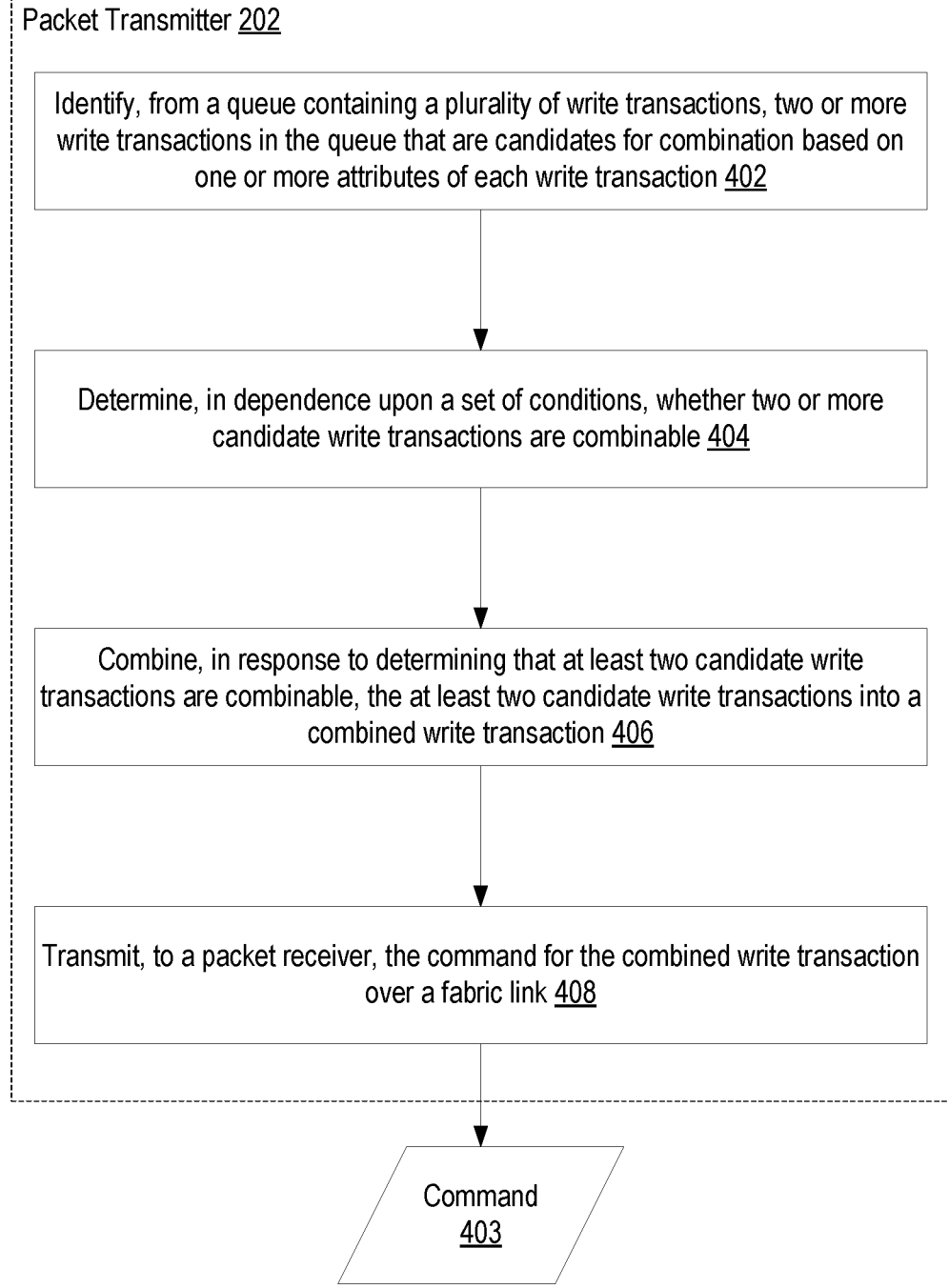
FIG. 4 sets forth a flow chart illustrating another example method of combining write transactions of a large write in accordance with embodiments of the present disclosure.

For further explanation, FIG. 4 sets forth a flow chart illustrating an example method of combining write transactions of a large write in accordance with embodiments of the present disclosure. The method of FIG. 4 includes identifying (402), by a packet transmitter (202) from a queue (204) containing a plurality of write transactions, two or more write transactions in the queue that are candidates for combination based on one or more attributes of each write transaction. In some examples, identifying (402), by the packet transmitter (202) from the queue (e.g., the ingress queue (204) of FIG. 2) containing the plurality of write transactions, two or more write transactions in the queue that are candidates for combination based on one or more attributes of each write transaction is carried out by the packet transmitter performing a CAM search on the queue to determine whether any write transactions in the queue share the same fabric identifier as an arriving write transaction. For example, the fabric identifier may include a transmit identifier and a tag. When the tag is reused by the source component for multiple write transactions, those write transaction are candidates for combining into a single write transaction. The fabric identifier may be included in the header of a request packet for a write transaction. In an embodiment, prior to identifying (402), by a packet transmitter (202) from the queue containing a plurality of write transactions, two or more write transactions in the queue that are candidates for combination based on one or more attributes of each write transaction, the packet transmitter (202) determines that sufficient latency (e.g., a latency threshold) permits the identification and combination of write transactions without adding to the existing latency.

In some examples, identifying (402), by the packet transmitter (202) from the queue containing the plurality of write transactions, two or more write transactions in the queue that are candidates for combination based on one or more attributes of each write transaction is also carried out by the two or more candidate write transactions include target memory addresses that are sequential. The packet transmitter (202) may inspect the target memory address field indicated in the request packet for each write transaction, and determine whether two or more write transactions are directed to sequential target memory addresses (e.g., consecutive offsets in a block of addresses). For example, two or more write transaction may target successive cache lines. Combinable write transactions must satisfy the condition that they target sequential memory addresses.

The method of FIG. 4 also includes determining (404), by the packet transmitter (202) in dependence upon a set of conditions, whether two or more candidate write transactions are combinable. In some examples, determining (404), by the packet transmitter (202) in dependence upon a set of conditions, whether two or more candidate write transactions are combinable is carried out by the packet transmitter (202) analyzing information in a request packet of each write transaction that has been identified as a candidate for combining, and determining that two or more of the candidate write transactions may be combined based on the information in the request packets. To be combined, each candidate write transaction must satisfy the same set of conditions. Non-limiting examples of conditions for combining may include commonality of: transaction or packet type, address locality characteristics, address compression characteristics, data compression characteristics, priority level, size, and so on.

The method of FIG. 4 also includes combining (406), by the packet transmitter in response to determining that at least two candidate write transactions are combinable, the at least two candidate write transactions into a combined write transaction. In some examples, combining (406), by the packet transmitter in response to determining that at least two candidate write transactions are combinable, the at least two candidate write transactions into a combined write transaction is carried out by the packet transmitter (202) setting control flags in the header of the command (403) for one write transaction and discarding the remaining write transactions (e.g., marking the entry of the combined write transaction as invalid the ingress queue (208) of FIG. 2). The control information indicates, to the packet receiver, how to decode the combine write transaction into the individual write transaction that were combined. For example, packet transmitter (202) may set a first control flag in the command (403) indicating that the command includes a combined write transaction, and may set a second control flag in the command (403) indicating how many write transactions have been combined and are therefore represented in the combined write transaction.

The method of FIG. 4 also includes transmitting (408), by the packet transmitter (202) to a packet receiver (e.g., the packet receiver (302) of FIG. 3), the command (403) for the combined write transaction over a fabric link (e.g., the fabric link (120) of FIG. 1). In some examples, transmitting (408), by the packet transmitter (202) to a packet receiver, the command (403) for the combined write transaction over the fabric link is carried out by the packet transmitter inserting the command (403) into a command flit and transmitting the command flit over the fabric link to the receiver. The command flit may include more than one command.

For further explanation, FIG. 5 sets forth another example method of combining write transactions of a large write in accordance with embodiments of the present disclosure. The method of FIG. 5 is similar to the method of FIG. 4 in that the method of FIG. 5 also includes identifying (402), by a packet transmitter (202) from a queue containing a plurality of write transactions, two or more write transactions in the queue that are candidates for combination based on one or more attributes of each write transaction, determining (404), by the packet transmitter (202) in dependence upon a set of conditions, whether two or more candidate write transactions are combinable, combining (406), by the packet transmitter in response to determining that at least two candidate write transactions are combinable, the at least two candidate write transactions into a combined write transaction, and transmitting (408), by the packet transmitter (202) to a packet receiver, the command (403) for the combined write transaction over a fabric link.

The method of FIG. 5 differs from the method of FIG. 4, however, in that identifying (402), by a packet transmitter (202) from a queue containing a plurality of write transactions, two or more write transactions in the queue that are candidates for combination based on one or more attributes of each write transaction includes determining (502) whether a fabric identifier of an incoming write transaction matches a fabric identifier of an existing write transaction in the queue. In some examples, determining (502) whether a fabric identifier of an incoming write transaction matches a fabric identifier of an existing write transaction in the queue is carried out by the packet transmitting (202) performing a CAM search on the queue to determine whether an existing entry has the same fabric identifier as the incoming write transaction. The existing entry may itself be a combined write transaction representing multiple write transactions.

The method of FIG. 5 also differs from the method of FIG. 4 in that identifying (402), by a packet transmitter (202) from a queue containing a plurality of write transactions, two or more write transactions in the queue that are candidates for combination based on one or more attributes of each write transaction also includes determining (504) whether an offset entry of the incoming write transaction and an offset entry of the existing write transaction are consecutive. In some examples, determining (504) whether an offset entry of the incoming write transaction and an offset entry of the existing write transaction are consecutive is carried out by the packet transmitter (202) determining whether the existing entry has a target memory address offset that is one less than the offset in an offset field of the incoming write transaction.

For further explanation, FIG. 6 sets forth another example method of combining write transactions of a large write in accordance with embodiments of the present disclosure. The method of FIG. 6 is similar to the method of FIG. 4 in that the method of FIG. 6 also includes identifying (402), by a packet transmitter (202) from a queue containing a plurality of write transactions, two or more write transactions in the queue that are candidates for combination based on one or more attributes of each write transaction, determining (404), by the packet transmitter (202) in dependence upon a set of conditions, whether two or more candidate write transactions are combinable, combining (406), by the packet transmitter in response to determining that at least two candidate write transactions are combinable, the at least two candidate write transactions into a combined write transaction, and transmitting (408), by the packet transmitter (202) to a packet receiver, the command (403) for the combined write transaction over a fabric link (120).

The method of FIG. 6 differs from the method of FIG. 4, however, in that determining (404), by the packet transmitter (202) in dependence upon a set of conditions, whether two or more candidate write transactions are combinable includes determining (602) whether the two or more candidate write transactions use the same data compression scheme. In some examples, determining (602) whether the two or more candidate write transactions use the same data compression scheme is carried out by inspecting the data associated with each write transaction to determine whether the data is compressible using the same compression scheme. For example, data may be organized such that every other byte of data is non-zero. In one compression scheme, bytes that include only zeroes are removed. In another example, data may be organized such that every fourth byte is non-zero, and the data compression scheme removes bytes that have only zeroes. When combining write transactions, the control information may be added to the command of the combined write transaction indicating type of data compression scheme. Therefore, in an embodiment, to combine write transactions into one command, all of the write transaction must satisfy the condition that the associated data is compressible using the same data compression scheme.

Figure 7:
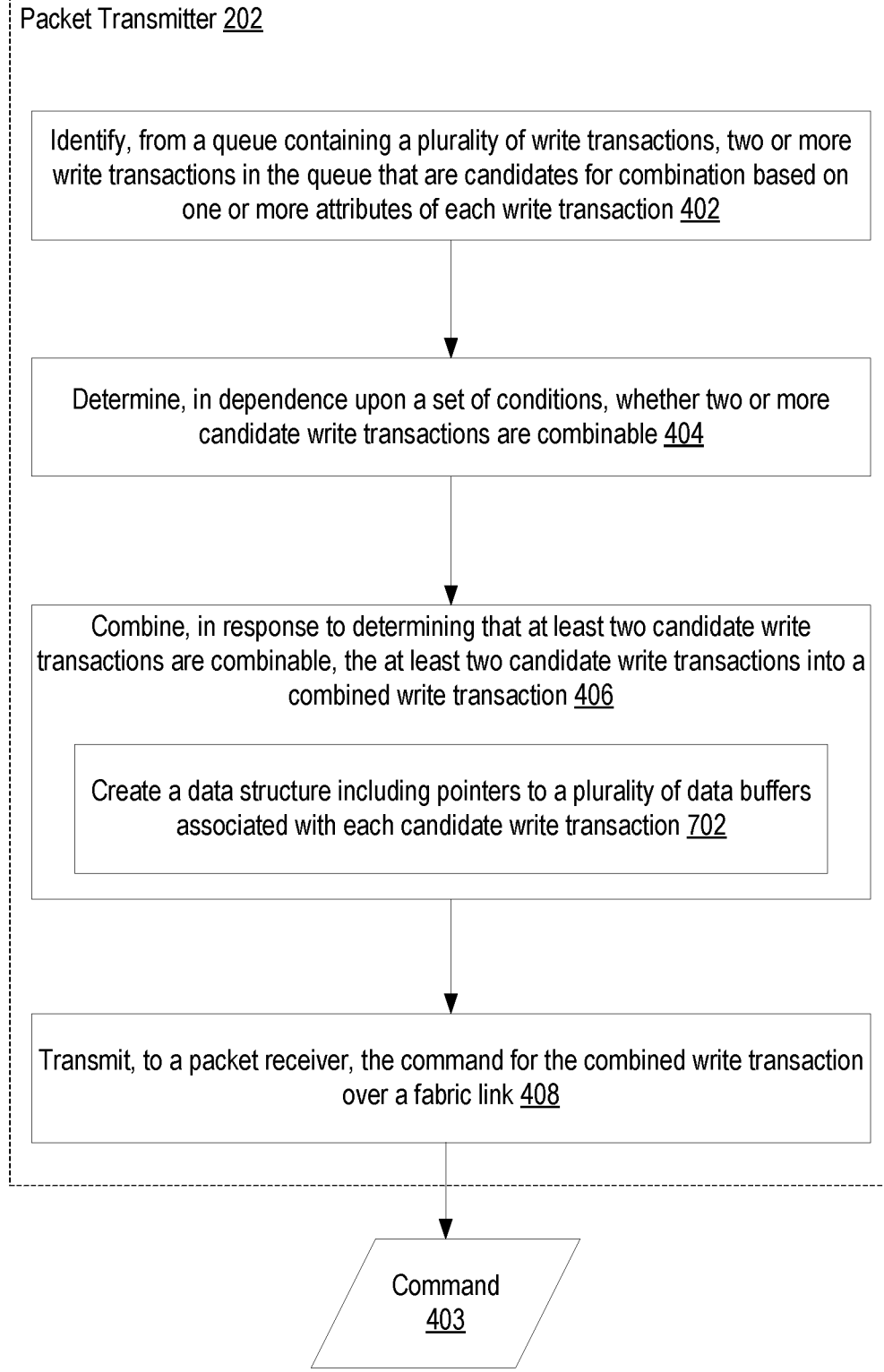
FIG. 7 sets forth a flow chart illustrating another example method of combining write transactions of a large write in accordance with embodiments of the present disclosure.

For further explanation, FIG. 7 sets forth another example method of combining write transactions of a large write in accordance with embodiments of the present disclosure. The method of FIG. 7 is similar to the method of FIG. 4 in that the method of FIG. 7 also includes identifying (402), by a packet transmitter (202) from a queue (204) containing a plurality of write transactions, two or more write transactions in the queue that are candidates for combination based on one or more attributes of each write transaction, determining (404), by the packet transmitter (202) in dependence upon a set of conditions, whether two or more candidate write transactions are combinable, combining (406), by the packet transmitter in response to determining that at least two candidate write transactions are combinable, the at least two candidate write transactions into a combined write transaction, and transmitting (408), by the packet transmitter (202) to a packet receiver, the command (403) for the combined write transaction over a fabric link (120).

The method of FIG. 7 differs from the method of FIG. 4, however, in that combining (406), by the packet transmitter in response to determining that at least two candidate write transactions are combinable, the at least two candidate write transactions into a combined write transaction includes creating (702) a data structure including pointers to a plurality of data buffers associated with each candidate write transaction. In some examples, creating (702) a data structure including pointers to a plurality of data buffers associated with each candidate write transaction is carried out by creating a linked list of pointers to the plurality of data buffers and associating the combined write transaction with a pointer to the linked list, such that when data for the combined write transaction is loaded for transmission of over the fabric link, the linked list is advanced to identify each successive data buffer to load. As an incoming write transaction is combined with an existing write transaction or existing combined write transaction in the queue, a pointer to the data buffer associated with the incoming write transaction is appended to the linked list. In this example, when the combined write transaction is transmitted over the fabric link as a command, the first data buffer is identified from the pointer to the linked list and is loaded (e.g., into a data flit), then the next data buffer is identified from the next pointer in the linked list and is loaded (e.g., into the data flit), and so on until the data in all of the data buffers associated with each individual write transaction represented in the combined write transaction has been transmitted.

Figure 8:
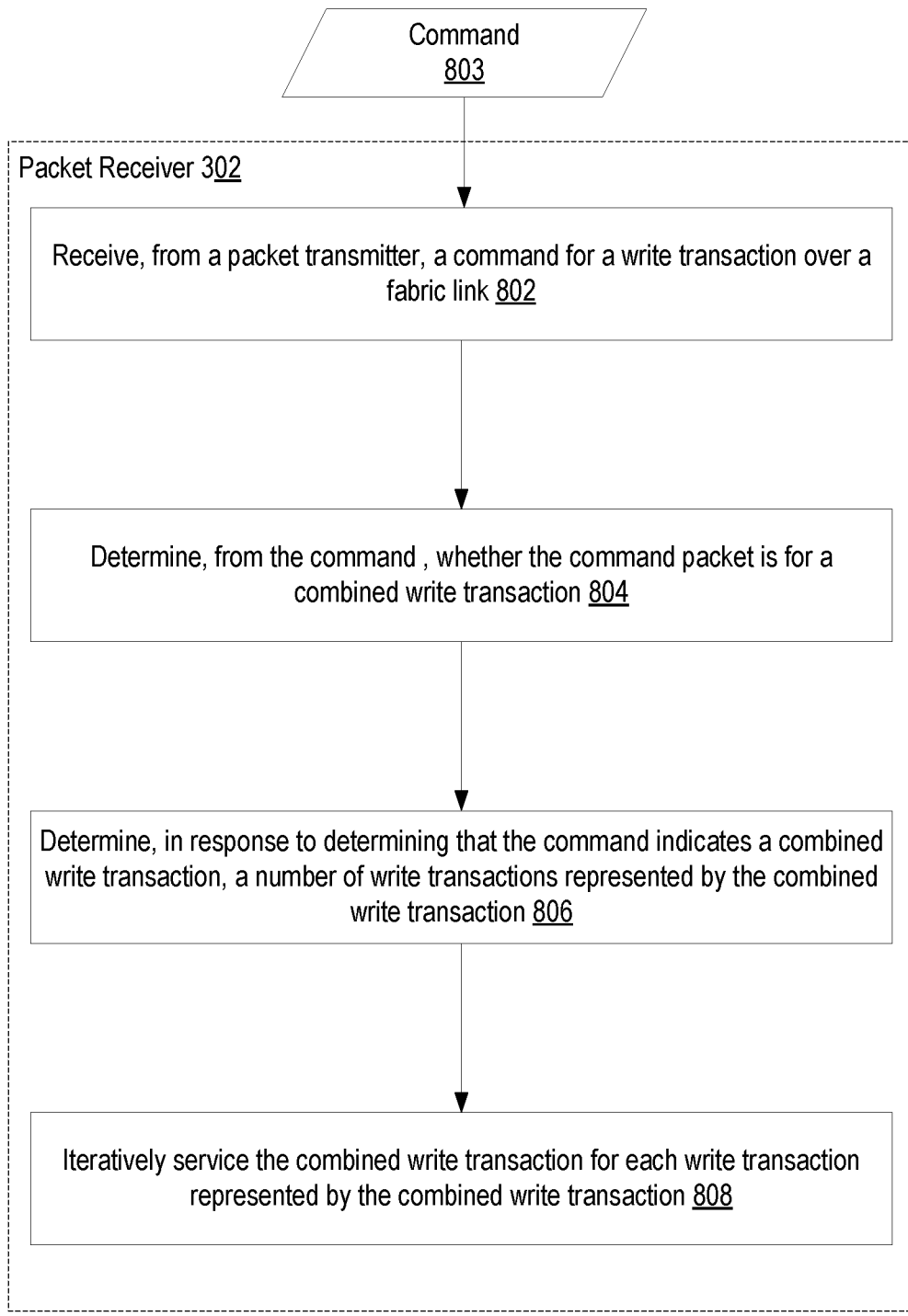
FIG. 8 sets forth a flow chart illustrating another example method of combining write transactions of a large write in accordance with embodiments of the present disclosure.

For further explanation, FIG. 8 sets forth a flow chart illustrating an example method of combining write transactions of a large write in accordance with embodiments of the present disclosure. The method of FIG. 8 includes receiving (802), by a packet receiver (302) from a packet transmitter (e.g., the packet transmitter (202) of FIG. 2), a command (803) for a write transaction over a fabric link (120). In some examples, receiving (802), by a packet receiver (302) from a packet transmitter, a command (803) for a write transaction over a fabric link (120) is carried out by receiving a command flit that includes the command (803), unpacking the command (803) from the command flit (which may contain more than one command), and inserting the command (803) into a queue (e.g., the request egress queue (304) of FIG. 3). In some examples, the packet receiver (302) may include multiple egress queues according to a transaction type, as previously discussed. In the example of FIG. 3, egress queue (304) is a request queue for dispatching read/write requests.

The method of FIG. 8 also includes determining (804), by the packet receiver (302) from the command (803), whether the command (803) is for a combined write transaction. In some examples, determining (804), by the packet receiver (302) from the command (803), whether the command (803) is for a combined write transaction is carried out by the packet receiver (302) inspecting the command (803) to determine whether control information indicates that the command packet includes a combined write transaction. For example, a first control flag in the header of the command (803) may indicate that the command (803) includes a combined write transaction The method of FIG. 8 also includes determining (806), by the packet receiver (302) in response to determining that the command (803) indicates a combined write transaction, a number of write transactions represented by the combined write transaction. In some examples, determining (806), by the packet receiver (302) in response to determining that the command (803) indicates a combined write transaction, a number of write transactions represented by the combined write transaction is carried out by the packet receiver (302) inspecting the command (803) to determine how many write transactions (e.g., a cache line count) are represented by the combined write transaction. For example, the command (803) may include a second control flag in the header of the command (803) indicating how many write transactions have been combined and are therefore represented in the combined write transaction. In one example, a 2-bit control flag in the header of the command (803) indicates that 1-4 write transactions are represented by the combined write transaction of the command (803).

The method of FIG. 8 also includes iteratively servicing (808), by the packet receiver (302) (e.g., from the egress queue (304) of FIG. 3), the combined write transaction for each write transaction represented by the combined write transaction. In some examples, iteratively servicing (808) the combined write transaction for each individual write transaction represented in the combined write transaction is carried out by a finite state machine that regenerates write transactions from the combined write transaction. In one example, when a combined write transaction is ready for dispatch onto the communications fabric, the combined write transaction is dispatched to the target memory address identified in the combined write transaction along with a pointer to a data buffer. The egress queue manager (308) increments the target memory address of the combined write transaction and dispatches another write transaction to the incremented target memory address with the pointer to the next data buffer. This process is repeated until the number of times the combined write transaction is serviced is equal to the number of write transactions indicated in the combined write transaction. In other words, for example, the target memory address is read from the queue entry of the combined write transaction and the entry's data buffer pointer is used to read the associated data; because the write transaction is indicated to be a combined write transaction, instead of deleting the entry, the address offset is incremented, a remaining combined write count is decremented, and the current buffer pointer is used to update/replace itself with the buffer pointer it indexes in the linked list.

Figure 9:
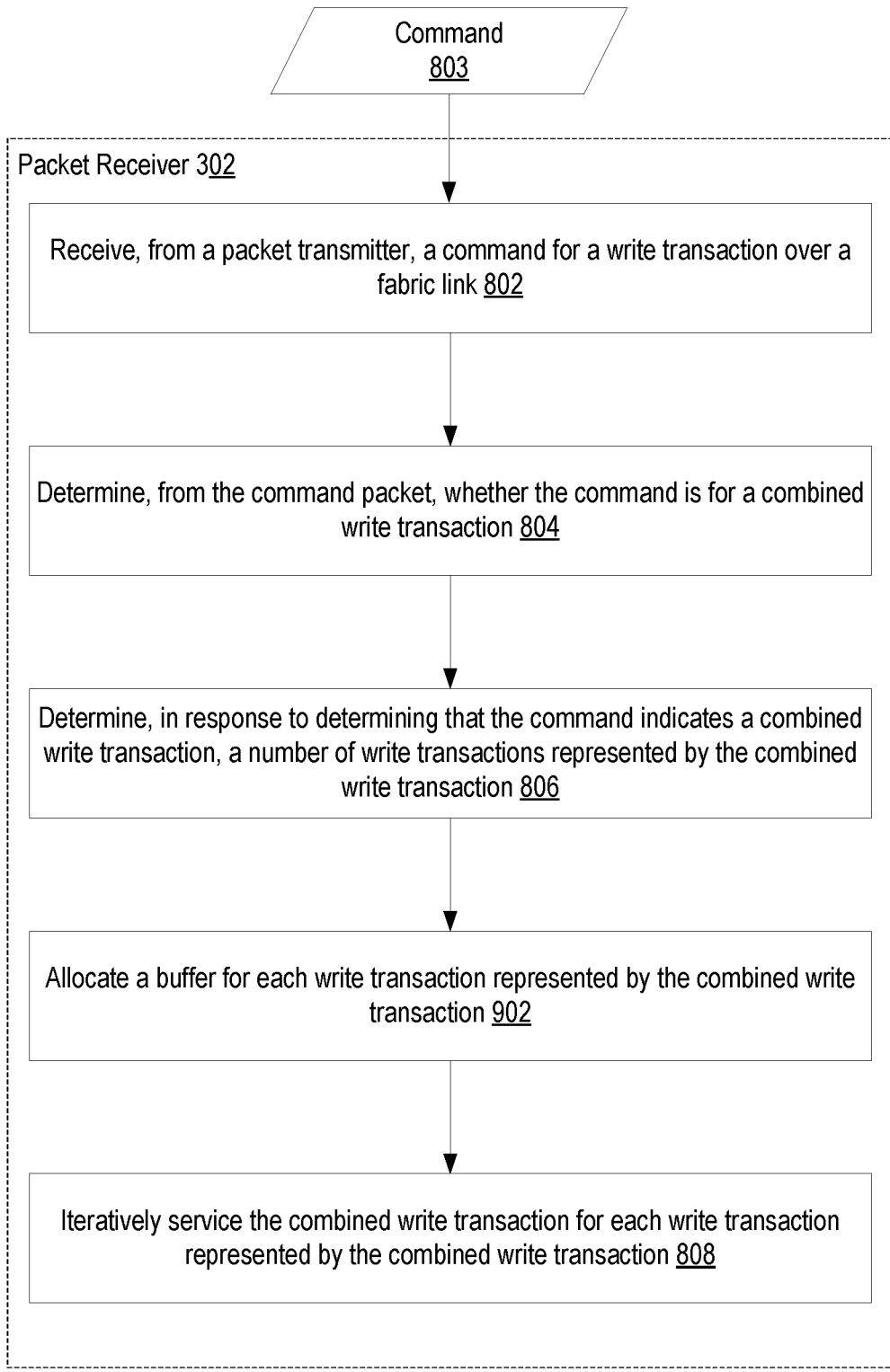
FIG. 9 sets forth a flow chart illustrating another example method of combining write transactions of a large write in accordance with embodiments of the present disclosure.

For further explanation, FIG. 9 sets forth another example method of combining write transactions of a large write in accordance with embodiments of the present disclosure. The method of FIG. 9 is similar to the method of FIG. 8 in that the method of FIG. 9 is carried out in a system that includes a packet receiver (302) coupled to a fabric link (120). The method of FIG. 9 is also similar to the method of FIG. 8 in that the method of FIG. 9 also includes receiving (802), by a packet receiver (302) from a packet transmitter, a command (803) for a write transaction over a fabric link (120), determining (804), by the packet receiver (302) from the command (803), whether the command (803) is for a combined write transaction, determining (806), by the packet receiver (302) in response to determining that the command (803) indicates a combined write transaction, a number of write transactions represented by the combined write transaction, and iteratively servicing (808), by the packet receiver (302), the combined write transaction for each write transaction represented by the combined write transaction.

The method of FIG. 9 differs from the method of FIG. 8, however, in that the method of FIG. 9 also includes allocating (902), by the packet receiver (302), a data buffer for each individual write transaction represented by the combined write transaction. In some examples, allocating (902), by the packet receiver (302), a data buffer for each individual write transaction is carried out by allocating a data buffer to receive data packets corresponding to each write transaction decoded from the combined write transaction. For example, if a combined write transaction includes four individual write transactions, a data buffer is respectively allocated to each individual write transaction represented by the combined write transaction. In one example, a linked list of pointers to data buffers allocated to the write transactions of the combined write transaction is constructed. When each write request is dispatched to the communications fabric, the write request includes a pointer to a data buffer that is identified by advancing the linked list.

Figure 10:
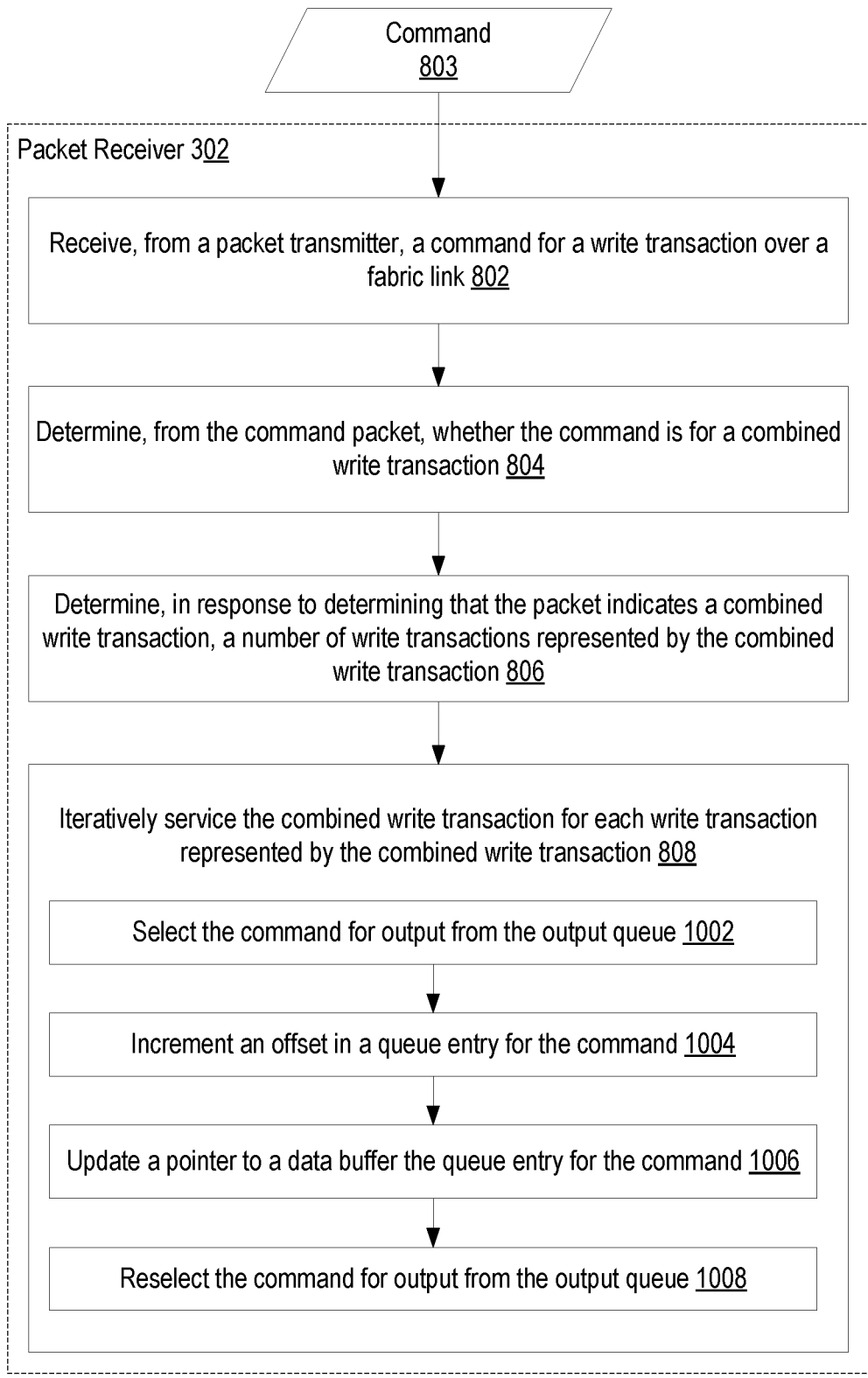
FIG. 10 sets forth a flow chart illustrating another example method of combining write transactions of a large write in accordance with embodiments of the present disclosure.

For further explanation, FIG. 10 sets forth another example method of combining write transactions of a large write in accordance with embodiments of the present disclosure. The method of FIG. 10 is similar to the method of FIG. 8 in that the method of FIG. 10 is carried out in a system that includes a packet receiver (302) coupled to a fabric link (120). The method of FIG. 10 is also similar to the method of FIG. 8 in that the method of FIG. 10 also includes receiving (802), by a packet receiver (302) from a packet transmitter, a command (803) for a write transaction over a fabric link (120), determining (804), by the packet receiver (302) from the command (803), whether the command (803) is for a combined write transaction, determining (806), by the packet receiver (302) in response to determining that the command (803) indicates a combined write transaction, a number of write transactions represented by the combined write transaction, and iteratively servicing (808), by the packet receiver (302), the combined write transaction for each write transaction represented by the combined write transaction.

The method of FIG. 10 differs from the method of FIG. 8, however, in that iteratively servicing (808), by the packet receiver (302), the combined write transaction for each write transaction represented by the combined write transaction includes selecting (1002) the command for output from the output queue. In some examples, selecting (1002) the command for output from the output queue is carried out by the packet receiver (302) outputting a write request for the combined write transaction in the command including data associated with the write request that has been received in a data buffer. For example, the data associated with the write request corresponds to one cache line.

The method of FIG. 10 also differs from the method of FIG. 8, however, in that iteratively servicing (808), by the packet receiver (302), the combined write transaction for each write transaction represented by the combined write transaction also includes incrementing (1004) an offset in a queue entry for the command of the combined write transaction. In some examples, incrementing (1004) an offset in a queue entry for the command is carried out by the packet receiver (302) incrementing the offset in the queue entry for the command, whereby incrementing the offset increments the cache line entry for a regenerated write transaction from the combined write transaction represented in the command.

The method of FIG. 10 also differs from the method of FIG. 8, however, in that iteratively servicing (808), by the packet receiver (302), the combined write transaction for each write transaction represented by the combined write transaction also includes updating (1006) a pointer to a data buffer the queue entry for the command. In some examples, updating (1006) a pointer to a data buffer the queue entry for the command is carried out by the packet receiver (302) moving a data pointer in the queue entry for the command to the next data buffer that holds data for the combined write transaction. For example, the next data buffer holds the next cache line in the combined write transaction.

The method of FIG. 10 also differs from the method of FIG. 8, however, in that iteratively servicing (808), by the packet receiver (302), the combined write transaction for each write transaction represented by the combined write transaction also includes reselecting (1008) the command for output from the output queue. In some examples, reselecting (1008) the command for output from the output queue is carried out by the packet receiver (302) outputting another write request for a write transaction in the command, the new write request including the incremented offset and data associated with the updated data buffer pointer. For example, the data associated with the new write request corresponds to the next cache line. The above steps are repeated for the number of write transactions represented by the combined write transaction.

In some embodiments, the packet receiver (302) inserting the received command (803) into the queue and regenerating write requests for the command N−1 times, where N is the number of write transactions indicated in the header of the received command (803). The regenerated write requests have respectively increasing target memory addresses beginning from the target memory address of the received command (803). For example, if the command (803) indicates four combined write transactions, the packet receiver (302) dispatches a first write request for the combined write transaction in the command and regenerates write requests for the command including a sequentially incremented target address. Continuing the example, the command (803) targets the address "x1000" and the control flag indicates that the command represents four combined write transactions. The packet receiver (302) regenerates a write request from the command with an incremented target location of "x1001" and dispatches the regenerated write request. The packet receiver (302) also regenerates a write request with an incremented target location of "x1010" and dispatches the regenerated write request. The packet receiver (302) also regenerates a write request with an incremented target location of "x1011" and dispatches the regenerated write request. It will be appreciated that the target memory address may be incremented by values other than 1 bit by design, and that the foregoing example increment should not be construed as limiting.

Figure 11:
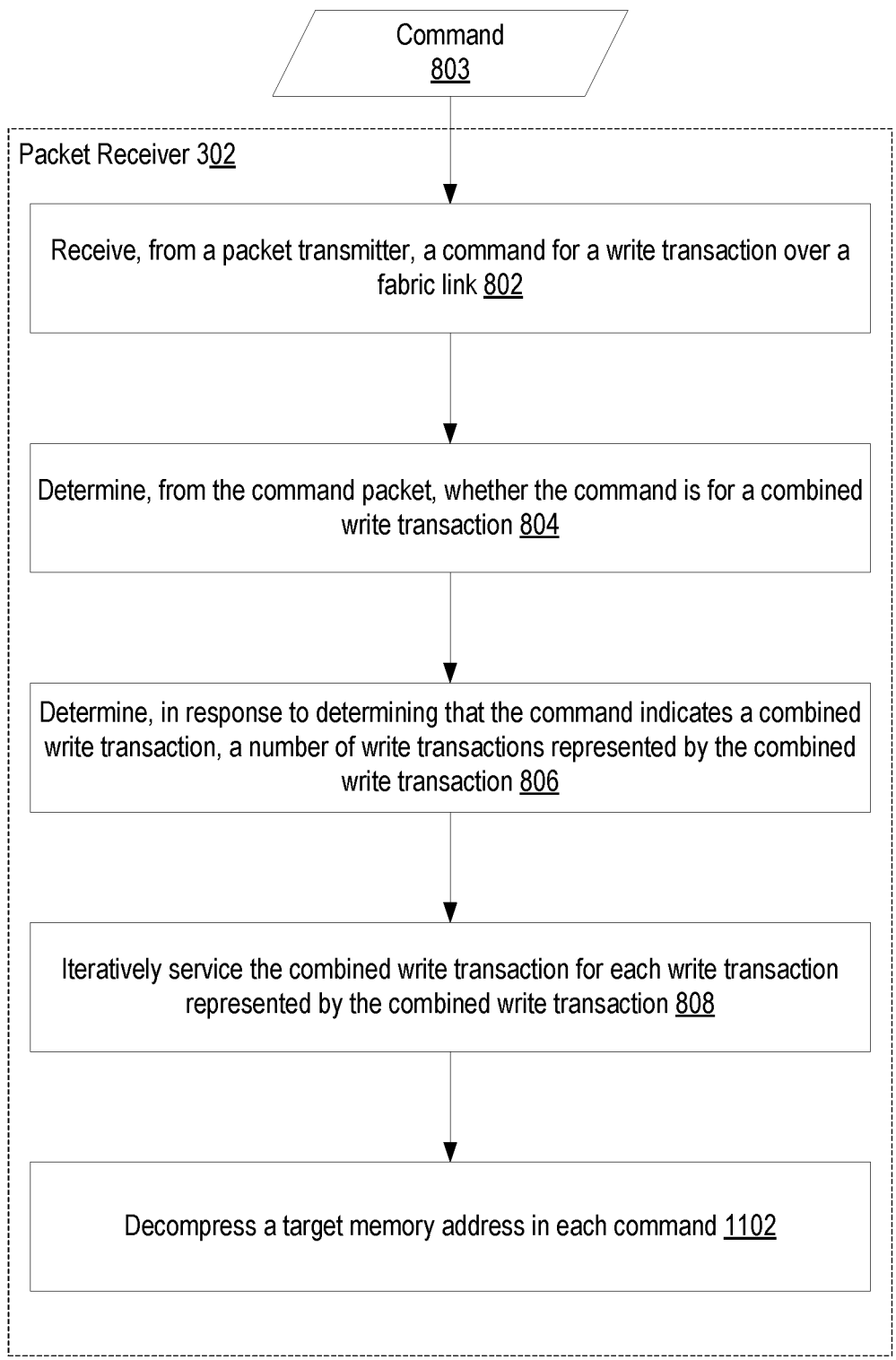
FIG. 11 sets forth a flow chart illustrating another example method of combining write transactions of a large write in accordance with embodiments of the present disclosure.

For further explanation, FIG. 11 sets forth another example method of combining write transactions of a large write in accordance with embodiments of the present disclosure. The method of FIG. 11 is similar to the method of FIG. 8 in that the method of FIG. 11 is carried out in a system that includes a packet receiver (302) coupled to a fabric link (120). The method of FIG. 11 is also similar to the method of FIG. 8 in that the method of FIG. 11 also includes receiving (802), by a packet receiver (302) from a packet transmitter, a command (803) for a write transaction over a fabric link (120), determining (804), by the packet receiver (302) from the command packet (803), whether the command (803) is for a combined write transaction, determining (806), by the packet receiver (302) in response to determining that the command (803) indicates a combined write transaction, a number of write transactions represented by the combined write transaction, and iteratively servicing (808), by the packet receiver (302), the combined write transaction for each write transaction represented by the combined write transaction.

The method of FIG. 11 differs from the method of FIG. 8, however, in that the method of FIG. 11 also includes decompressing (1102) a target memory address in the command (803). In some examples, decompressing (1102) a target memory address in the command (803) is carried out by the packet receiver (302) using an index in the command (803) to accessing an address cache (e.g., cache (312) in FIG. 3), and determining a cache entry that includes a portion of the decompressed target memory address. The portion may indicate block of addresses that includes the target memory address (e.g., the most significant bits of the decompressed target address). For example, the address cache of the packet receiver (302) may be synchronized with an address cache of the packet transmitter, such that an index or pointer in the header of the command may be included by the packet transmitter and decoded by the packet receiver.

Example embodiments are described largely in the context of a fully functional computing system. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present disclosure.

Embodiments can be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to some embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein is an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

What is claimed is:

1. A method of combining write transactions of a large write, the method comprising:
   storing, in a queue, a plurality of write transactions including a first write transaction, a second write transaction, and a third write transaction, wherein the first and second write transactions have a same fabric identifier, and the third write transaction has a different fabric identifier than the first and second write transactions;
   combining the first write transaction and the second write transaction; and
   transmitting the combined write transactions.

2. The method of claim 1, further comprising identifying the first write transaction and the second write transaction in the queue as candidates for combination, the identifying including:
   determining whether a fabric identifier of an incoming write transaction matches a fabric identifier of an existing write transaction in the queue; and
   determining whether an offset entry of the incoming write transaction and an offset entry of the existing write transaction are consecutive.

3. The method of claim 2, wherein the fabric identifier includes a transmit identifier and a tag, wherein the tag identifies a block of target memory locations.

4. The method of claim 3, wherein the offset entry of the incoming write transaction and the offset entry of the existing write transaction each identify a target memory location in the block.

5. The method of claim 1, wherein the combined write transactions are transmitted in a command, wherein the command includes at least:
  a first control flag indicating that the command includes a combined write transaction; and
  a second control flag indicating a number of write transactions that have been combined.

6. The method of claim 1 further comprising:
  receiving a command for a combined write transaction;
  determining a number of write transactions represented by the combined write transaction; and
  iteratively servicing the combined write transaction for each write transaction represented by the combined write transaction.

7. The method of claim 6, wherein iteratively servicing the combined write transaction for each write transaction represented by the combined write transaction includes:
  selecting the command for output from an output queue;
  incrementing an offset in a queue entry for the command;
  updating a pointer to a data buffer the queue entry for the command; and
  reselecting the command for output from the output queue.

8. The method of claim 6, wherein the command for the combined write transaction includes:
  a first control flag indicating that the command includes a combined write transaction; and
  a second control flag indicating the number of write transactions that have been combined.

9. The method of claim 1, further comprising identifying the first write transaction and the second write transaction in the queue as candidates for combination, the identifying including:
  determining whether a target memory block an incoming write transaction is identical to the target memory block of an existing write transaction in the queue.

10. The method of claim 1, further comprising identifying the first write transaction and the second write transaction in the queue as candidates for combination, the identifying including:
  determining whether a target memory address an incoming write transaction is sequential to the target memory address of an existing write transaction in the queue.

11. An apparatus for combining write transactions of a large write comprising:
  a processor including at least a first die and a second die;
  a link coupling the first die and the second die; and
  a link interface on the first die configured to transmit packets over the link, wherein the link interface is further configured to:
    store, in a queue, a plurality of write transactions including a first write transaction, a second write transaction, and a third write transaction, wherein the first and second write transactions have a same fabric identifier and the third write transaction has a different fabric identifier than the first and second write transactions;
  combine the first write transaction and the second write transaction; and
  transmit the combined write transactions.

12. The apparatus of claim 11, wherein the link interface is further configured to identify the first write transaction and the second write transaction in the queue as candidates for combination by:
  determining whether a fabric identifier of an incoming write transaction matches a fabric identifier of an existing write transaction in the queue; and
  determining whether an offset entry of the incoming write transaction and an offset entry of the existing write transaction are consecutive.

13. The apparatus of claim 12, wherein the fabric identifier includes a transmit identifier and a tag, wherein the tag identifies a block of target memory locations.

14. The apparatus of claim 13, wherein the offset entry of the incoming write transaction and the offset entry of the existing write transaction each identify a target memory location in the block.

15. The apparatus of claim 11, wherein combining the at least two write transactions further includes creating a data structure including pointers to a plurality of data buffers associated with each write transaction.

16. The apparatus of claim 11, wherein the combined write transactions are transmitted in a command, wherein the command includes at least:
  a first control flag indicating that the command includes a combined write transaction; and
  a second control flag indicating a number of write transactions that have been combined.

17. The apparatus of claim 10, wherein the link interface is further configured to:
  receive a command for a write transaction;
  determine, in response to identifying that the command indicates a combined write transaction, a number of write transactions represented by the combined write transaction; and
  iteratively service the combined write transaction for each write transaction represented by the combined write transaction.

18. The apparatus of claim 17, wherein iteratively servicing the combined write transaction for each write transaction represented by the combined write transaction includes:
  selecting the command for output from an output queue;
  incrementing an offset in a queue entry for the command;
  updating a pointer to a data buffer the queue entry for the command; and
  reselecting the command for output from the output queue.

19. A system for combining write transactions of a large write comprising:
  a processor including at least a first die and a second die;
  a link coupling the first die and the second die; and
  a link interface on the first die configured to transmit and receive packets over the link, wherein the link interface is further configured to:
    store, in a queue, a plurality of write transactions including a first write transaction, a second write transaction, and a third write transaction, wherein the first and second write transactions have a same fabric identifier and the third write transactions has a different fabric identifier than the first and second write transactions;
  combine the first write transaction and the second write transaction; and
  transmit the combined write transactions.

20. The system of claim 19, wherein the link interface is further configured to:
  receive a command for a write transaction;
  determine, in response to identifying that the command indicates a combined write transaction, a number of write transactions represented by the combined write transaction; and iteratively service the combined write transaction for each write transaction represented by the combined write transaction.

\* \* \* \* \*